US011415466B2

(12) United States Patent
Ude et al.

(10) Patent No.: US 11,415,466 B2
(45) Date of Patent: Aug. 16, 2022

(54) TEMPERATURE MEASURING DEVICE AND METHOD FOR DETERMINING TEMPERATURE

(71) Applicant: ABB Schweiz AG, Baden (CH)

(72) Inventors: Peter Ude, Hanau (DE); Wilhelm Daake, Petershagen (DE); Juergen Horstkotte, Enger (DE); Guruprasad Sosale, Weinheim (DE); Joerg Gebhardt, Mainz (DE); Paul Szasz, Plankstadt (DE); Andreas Decker, Darmstadt (DE)

(73) Assignee: ABB Schweiz AG, Baden (CH)

( * ) Notice: Subject to any disclaimer, the term of this patent is extended or adjusted under 35 U.S.C. 154(b) by 6 days.

(21) Appl. No.: 16/828,979

(22) Filed: Mar. 25, 2020

(65) Prior Publication Data

US 2020/0225096 A1 Jul. 16, 2020

Related U.S. Application Data

(63) Continuation of application No. PCT/EP2018/075901, filed on Sep. 25, 2018.

(51) Int. Cl.
| | | |
|---|---|---|
| *G01K 15/00* | (2006.01) | |
| *G01K 1/00* | (2006.01) | |
| *G01K 7/00* | (2006.01) | |
| *G01K 1/143* | (2021.01) | |
| *G01K 1/024* | (2021.01) | |

(Continued)

(52) U.S. Cl.
CPC ............. *G01K 1/143* (2013.01); *G01K 1/024* (2013.01); *G01K 1/12* (2013.01); *G01K 7/02* (2013.01)

(58) Field of Classification Search
USPC .............................. 374/1, 147, 137, 112, 166
See application file for complete search history.

(56) References Cited

U.S. PATENT DOCUMENTS

| | | |
|---|---|---|
| 481,205 A | 8/1892 | Shettler |
| 5,064,604 A | 11/1991 | Barton |
| (Continued) | | |

FOREIGN PATENT DOCUMENTS

| | | |
|---|---|---|
| CN | 1257816 A | 6/2000 |
| CN | 101675335 A | 3/2010 |
| (Continued) | | |

*Primary Examiner* — Mirellys Jagan
(74) *Attorney, Agent, or Firm* — Leydig, Voit & Mayer, Ltd.

(57) ABSTRACT

A temperature measuring device for determining a medium temperature by a temperature of a measuring point on a surface enclosing the medium includes: at least one measuring sensor; at least one reference sensor; and a measured value processing device which is connected via a cable to the at least one measuring sensor and via a cable to the at least one reference sensor. The at least one measuring sensor and the at least one reference sensor are arranged along a main thermal connection path between the surface enclosing the medium and surroundings. The at least one measuring sensor is arranged close to the measuring point. A thermal resistance between a relevant measuring sensor and the at least one reference sensor is smaller than a thermal resistance between a relevant reference sensor and the surroundings.

10 Claims, 2 Drawing Sheets

(51) Int. Cl.
    *G01K 1/12*     (2006.01)
    *G01K 7/02*     (2021.01)

(56) References Cited

U.S. PATENT DOCUMENTS

| | | | | |
|---|---|---|---|---|
| 5,249,864 A | * | 10/1993 | Fagan | G01K 13/02 374/110 |
| 5,271,675 A | * | 12/1993 | Fagan | G01D 5/353 250/227.16 |
| 6,089,146 A | | 7/2000 | Nam et al. | |
| 6,220,750 B1 | | 4/2001 | Palti | |
| 10,234,338 B2 | | 3/2019 | Rieder | |
| 10,386,246 B2 | | 8/2019 | Disselnkoetter et al. | |
| 2007/0206655 A1 | | 9/2007 | Haslett et al. | |
| 2010/0323059 A1 | | 12/2010 | Wallace | |
| 2013/0085708 A1 | | 4/2013 | Sattler | |
| 2016/0047697 A1 | | 2/2016 | Decker et al. | |
| 2016/0178446 A1 | | 6/2016 | Ude | |

FOREIGN PATENT DOCUMENTS

| | | |
|---|---|---|
| DE | 87677 B1 | 8/1980 |
| DE | 19800753 A1 | 7/1999 |
| DE | 29918228 U1 | 1/2000 |
| DE | 102011114620 A1 | 4/2013 |
| DE | 102011086974 A1 | 5/2013 |
| DE | 102014103430 A1 | 9/2015 |
| DE | 102014012086 A1 | 2/2016 |
| DE | 102014019365 A1 | 6/2016 |
| DE | 102015000728 A1 | 7/2016 |
| DE | 102016105949 A1 | 10/2017 |
| EP | 3064917 A1 | 7/2016 |
| WO | WO 2014164251 A1 | 10/2014 |

\* cited by examiner

TEMPERATURE MEASURING DEVICE AND METHOD FOR DETERMINING TEMPERATURE

CROSS-REFERENCE TO PRIOR APPLICATION

This application is a continuation of International Patent Application No. PCT/EP2018/075901, filed on Sep. 25, 2018, which claims priority to German Patent Application No. DE 10 2017 122 442.4, filed on Sep. 27, 2017. The entire disclosure of both applications is hereby incorporated by reference herein.

FIELD

The invention relates to a temperature measuring device for determining a medium temperature by means of the temperature of a surface enclosing the medium, comprising at least one measuring sensor and at least one reference sensor. The invention also relates to a method for determining a medium temperature.

BACKGROUND

In industrial process measurement technology, temperature measuring devices are known with which one or more temperature sensors are mounted in a protective tube which projects at least partially into the interior of the pipeline or of a container. For this purpose, an opening with associated sealing of the temperature measuring device must be provided in the pipe or the container.

Such invasive measuring arrangements have the disadvantage that components protrude into the process chamber, which may result in flow energy losses, abrasion, fracture damage, disruption of the cleaning processes and potential leakages. The explosion protection for each pipe and container opening may, where applicable, also have to be considered.

The field of application of the invention extends to temperature measuring devices with which a surface temperature sensor rests on a surface in order to determine the temperature of a medium lying underneath or behind it.

Ideally, such a sensor should take on the temperature of the medium enclosed by the surface. If the temperature sensor is designed, for example, as an electrical thermocouple, the temperature of the sensor and thus the temperature of the medium can be inferred by measuring the thermoelectric voltage, provided that both are in thermal equilibrium; that is, they have the same temperature.

DE 198 00753 A1 discloses a non-invasive temperature measuring device comprising a measuring sensor and a reference sensor, with which the measuring sensor is connected to the measuring point, the reference sensor is kept at ambient temperature, and the measuring sensor and the reference sensor are spaced apart by thermal insulation material.

A disadvantage of this procedure known from the generally known prior art is that the surface temperature sensor thermally interacts not only with the surface but also with its surroundings, for example the surrounding air. As a result, the surface temperature sensor in practice does not measure the temperature of the medium or of the surface but a mixed temperature which is between the temperature of the medium and the ambient temperature. Usually, the reference temperature sensor is mounted far away from the process, generally in the transmitter head.

In this case, it must be taken into account that ambient temperature changes, which also act on the mechanical connection between the sensor and the transmitter head, can considerably reduce the measuring accuracy. They are therefore often provided with thermal insulation, the actual effect of which in the application is usually unknown.

In the event of changes in the process temperature, a reference temperature sensor far away from the process also only reaches its new thermal equilibrium value extremely slowly. For a compensation algorithm, this often means a delay behavior over several minutes.

DE 87 677 B1 discloses a temperature measuring device for determining the temperature of liquid and viscous masses, which device, in addition to a sensor in the tip of a rod-shaped temperature probe immersing in the medium, comprises a second sensor in the shaft of the probe. The device has a computing unit with an approximation formula electronically stored thereon for calculating a medium temperature approximation, wherein the approximation formula is stored as a sum of the mixed temperature and a product of two factors, wherein the first factor results from the difference between the mixed temperature and the ambient temperature and the second factor represents a calibration factor.

US 2007/0206655 A1 describes a device and method for determining the temperature of a human body, wherein the device is arranged on the body surface. In this case, the conveyed technical teaching assumes that physical properties of the measured object, in particular the heat transfer resistance of the skin, are sufficiently precisely known within a certain tolerance. Furthermore, the correct placement of the device at a predetermined measuring point is required. Obvious uncertainties in the placement and the heat transfer resistance are countered with a one-dimensional or two-dimensional sensor array at least for determining the surface temperature. Furthermore, the conveyed technical teaching provides a thermally insulating intermediate layer between the measuring points for the surface temperature and the ambient temperature, the properties of which, in particular the heat transfer resistance of which, are sufficiently known because the layer thickness and the material used are known. In light of the background of known physical properties, the technical teaching provides for determining the body temperature from the local surface temperature and the ambient temperature with the aid of known heat transfer resistances. Apart from the unsuitability of the disclosed materials in the industrial field, in particular in the high-temperature range>400° C., the determining heat transfer resistances in the range of industrial temperature measurement technology are frequently completely unknown.

SUMMARY

In an embodiment, the present invention provides a temperature measuring device for determining a medium temperature by a temperature of a measuring point on a surface enclosing the medium, comprising: at least one measuring sensor; at least one reference sensor; and a measured value processing device which is connected via a cable to the at least one measuring sensor and via a cable to the at least one reference sensor, wherein the at least one measuring sensor and the at least one reference sensor are arranged along a main thermal connection path between the surface enclosing the medium and surroundings, wherein the at least one measuring sensor is arranged close to the measuring point, and wherein a thermal resistance between a relevant measuring sensor and the at least one reference sensor is smaller than a thermal resistance between a relevant reference sensor and the surroundings.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
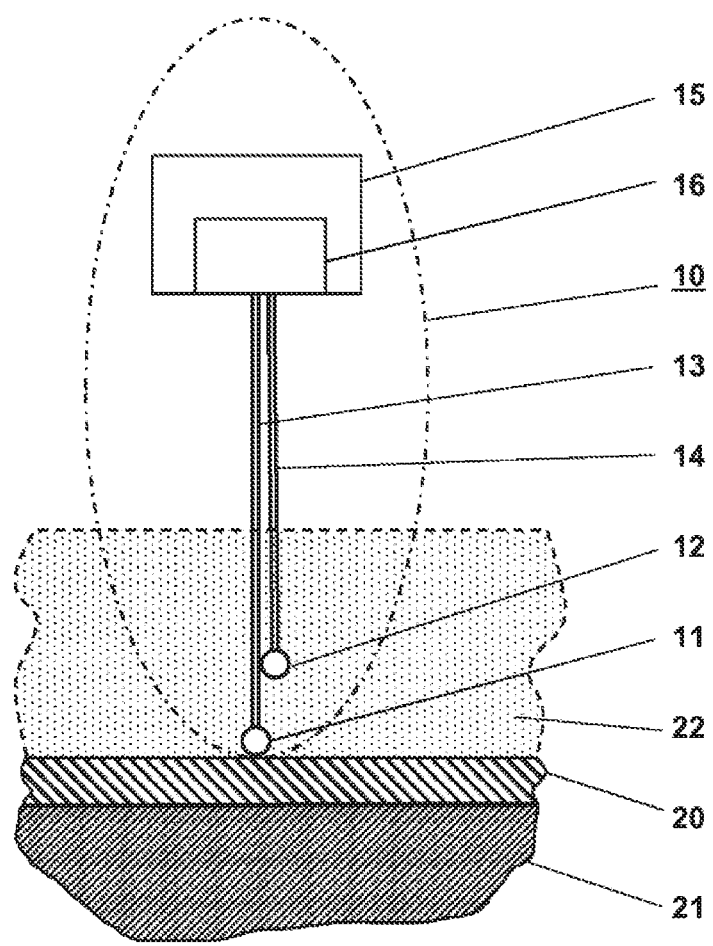
FIG. 1 a first embodiment of a temperature measuring device with at least one mineral-insulated sheathed cable, FIG. 2 a second embodiment of a temperature measuring device with a holder.

In an embodiment, the present invention provides a temperature measuring device for the non-invasive measurement of a medium temperature through a housing wall surrounding the medium, the dynamic measuring accuracy of which is improved.

The invention starts with at least one temperature measuring device for determining a medium temperature by means of the temperature of a surface enclosing the medium, comprising at least one measuring sensor lying on the surface and at least one reference sensor spaced apart from the medium, wherein the at least one measuring sensor and the at least one reference sensor are connected to a common measured value processing device which has the ambient temperature. The processing device is configured to determine a temperature gradient along a main thermal connection path that includes the at least one measuring sensor and the at least one reference sensor. The processing device further determines a correction value for correcting a measured value of the at least one measuring sensing based on the temperature gradient.

According to the invention, the at least one measuring sensor and the at least one reference sensor are thermally connected at different distances to the same thermally conductive element, which is arranged between the at least one measuring sensor and the common measured value processing device.

In other words, the at least one measuring sensor and the at least one reference sensor are arranged on the same thermal route between the medium and the common measured value processing device. While the known prior art teaches the person skilled in the art to keep the at least one reference sensor at the ambient temperature, if possible, or at least close to the ambient temperature, it has surprisingly been found that this structurally complex arrangement not only is dispensable, but also leads to poor response behavior of the temperature measuring device. Rather, it is sufficient to tap the thermal route between the process temperature of the medium to be determined and the ambient temperature of the common measured value processing device in the manner of a voltage divider, at the tap of which the at least one reference sensor is arranged.

Since the measuring sensor and the at least one reference sensor are thermally connected to the same thermally conductive element, temperature changes both in the process temperature of the medium and in the ambient temperature simultaneously affect both sensors, but in different quantities. This lastingly improves the response behavior to any temperature changes independently of possible thermal insulations of the container.

In a particularly advantageous embodiment of the invention, both the at least one measuring sensor and the at least one reference sensor are designed as commercially available measuring inserts for industrial temperature measurement, so-called insets. In particular for high-temperature measurements, such measuring inserts consist of a mineral-insulated sheathed cable which is equipped at one end with a temperature-sensitive element or whose inner, unidirectionally connected conductors already form a thermocouple. Such measuring inserts have the robustness and temperature resistance required in the industrial environment, in particular above 200° C., with which standard cables and standard insulation materials cannot be used.

Moreover, the arrangement according to the invention leads to a compact design of the temperature measuring device, since both the at least one measuring sensor and the at least one reference sensor are arranged on the same path between the measuring point on the container and the measured value processing device.

In particular, the at least one measuring sensor is connected to the measuring point on the container via a highly thermally conductive connection, for example with a thermal resistance R0. The at least one reference sensor is arranged at a distance from the measuring point on the container on the main thermal connection path between the measuring point on the container and the surroundings. The ambient influences acting on the at least one measuring sensor are largely completely detected in this case. For the person skilled in the art, the term "main thermal connection path" within the context of this disclosure means that the thermal conduction from the measuring point outward, to the surroundings within the meaning of a thermal reservoir, or vice versa inward, in cold processes, can be described in good approximation by a linear sequence of thermal resistances along this path forming a gradient of thermal resistances corresponding to the temperature gradient. Lateral heat flow leakages or inflows occur only to a slight extent.

The reference sensor is placed between the measured value processing device and the measuring sensor. The respective reference sensor advantageously has a well-defined thermal resistance R1 to the measuring sensor and a well-defined thermal resistance R2 to the ambient temperature. In the case of standard thermometer insets, such thermal resistances are approximately proportional to the length of the inset between the respective temperature measuring points. The thermal resistance R2 also includes the thermal resistance of the measured value processing device along with the convective resistance between the outer surface of the measured value processing device and ambient air.

In summary, the difference of the present invention to the known prior art consists of installing the at least one reference sensor no longer far from the process as before with R1»R0 and R1»R2 but such that, for example, R1≈R0 and R1«R2.

With and without insulation of the container, the selected arrangement results in only slight deviations from the respective actual temperature of the surface, both at a constant and at a variable surface temperature. The case without insulation is often tolerable because the sensor arrangement may advantageously be surrounded by a holding structure of moderately thermally conductive metal, such as stainless steel. Such a holding structure can consist of a metal pipe adapter which is fastened to the pipe with metal strips, for example, and additionally also of a so-called "neck pipe." The sensor arrangement with the thermal path which is essential for the measuring principle can then generally be separated from the neck pipe and from the pipe adapter by an air layer, for example. This advantageously influences the dominance of the thermal main path along the sensors since the air layers already have a highly thermally insulating effect.

As a result, quasi-static temperature compensation for calculating the surface temperature is then sufficient even with rapid changes of the latter. The formation of derivatives with respect to time of the measurement signals, which can generally present major problems because they amplify measurement noise, can advantageously be dispensed with.

The surface temperature is calculated from the measurement signals of the measuring sensor and of the reference sensor using methods known per se, such as are described, for example, in DE 10 2014 019 365.

A temperature measuring device in which the reference sensor is at least thermally closer to the measuring sensor than to the measured value processing device, such that R1<R2, has proven to be particularly advantageous. Thus, for all thermally conductive connections between the measuring sensor and the measured value processing device, whose thermal resistances are approximately proportional to the length, which in particular but not conclusively includes the aforementioned mineral-insulated sheathed cables, the geometric distance of the reference sensor from the measuring sensor is less than the geometric distance of the reference sensor from the measured value processing device.

Surprisingly, it has been found to be particularly advantageous if the ratio of the thermal resistances R2/R1 is >10. Thus, for all thermally conductive connections between the measuring sensor and the measured value processing device, whose thermal resistances are approximately proportional to the length, which in particular but not conclusively includes the aforementioned mineral-insulated sheathed cables, the geometric distance of the reference sensor from the measuring sensor is much less than the geometric distance of the reference sensor from the measured value processing device.

Even with a ratio of the thermal resistances R2/R1>50, the aforementioned advantages of the temperature measuring device according to the invention occur. The reference sensor is geometrically only slightly spaced from the measuring sensor. Such an arrangement advantageously facilitates miniaturization and compact designs of the temperature measuring device. Accommodating the measuring sensor and the reference sensor in a common housing is particularly advantageous.

According to another feature of the invention, at least one further reference sensor is arranged on the main thermal connection path between the measuring point on the container and the surroundings. The accuracy of the temperature measuring device is improved with each additional reference temperature. In addition, additional reference temperatures also allow diagnoses as to whether the insulation is sufficient, the assembly or ambient conditions correspond to the requirements, or how one-dimensional the thermal path is.

According to a further feature of the invention, various sensor element types, such as resistance thermometers (negative or positive temperature coefficient resistors), thermocouples, are permissible for the measuring sensor and the reference sensor in any desired combination in the same temperature measuring device.

According to another feature of the invention, the angle of the temperature measuring device to the measuring surface can be selected arbitrarily. The measuring arrangement can be arranged both vertically and in parallel or at any other angle to the measuring surface. Measuring points at measuring locations that are difficult to access can thus advantageously also be operated.

FIG. 1 shows a temperature measuring device 10 with its components essential to the invention in a schematic diagram on a cut-out container wall 20. The temperature measuring device 10 essentially consists of a head housing 15, in which measured value processing device 16 is accommodated. A measuring sensor 11 is connected via a cable 13 to the measured value processing device 16 in the head housing 15. A reference sensor 12 is also connected via a separate cable 14 to the measured value processing device 16 in the head housing 15.

A measuring point for determining the temperature of a medium 21 which is enclosed in a container is also shown. A section of a container wall 20 of the container at the measuring point is representatively shown in this respect.

The temperature measuring device 10 is arranged outside the container, in the drawing plane above the container wall 20, at the measuring point, and the medium 21 is enclosed inside the container, in the drawing plane below the container wall 20.

On the outer surface of the container wall 20, the container may have a thermal insulation layer 22 which at least reduces heat flow between the outer surface of the container wall 20 and the surroundings.

For determining the medium temperature, the temperature measuring device 10 is arranged at the measuring point in such a way that the measuring sensor 11 is located near the surface of the container wall 20 enclosing the medium 21.

At least the cable 13 to the measuring sensor 11 is designed as a mineral-insulated sheathed cable known per se. The design of such a mineral-insulated sheathed cable necessitates its thermal resistance to be approximately proportional to its length. Thus, the measuring sensor 11 is connected via a known thermal resistance to the measured value processing device 16 in the head housing 15, which takes on the ambient temperature.

In this embodiment, the measuring sensor 11 is advantageously designed as a thermocouple, the measuring tip of which is brought into contact with the container wall 20.

In particular, provision can be made to equip the measuring tip with a silver insert or to form a silver tip. Advantageously, the thermal resistance R0 is thereby reduced to a minimum.

The mineral-insulated sheathed cable of the cable 13 to the measuring sensor 11 forms the main thermal connection path between the measuring point on the container wall 20 and the surroundings; that is, between the surface temperature and the ambient temperature.

Along this main thermal connection path, the reference sensor 12 is at least thermally connected to the cable 13 to the measuring sensor 11.

By way of example but not conclusively, the reference sensor 12 is joined to the cable 13 by gluing, welding, soldering, clamping or crimping. The reference sensor 12 can be designed as a resistance element.

The geometric distance of the reference sensor 12 from the measuring sensor 11 is smaller than the geometric distance of the reference sensor 12 from the measured value processing device 16 in the head housing 15. Given the proportionality of the thermal resistance of the mineral-insulated sheathed cable of the cable 13 to the measuring sensor 11, the ratio of the thermal resistances R2/R1 is in any case>1. All ratios of the thermal resistances R2/R1 are particularly advantageously>10. The reference sensor 12 is arranged in the immediate vicinity of the measuring sensor 11.

Depending on the maximum temperatures at the point of use, the cable 14 to the reference sensor 12 can also be designed as a mineral-insulated sheathed cable.

Figure 2:
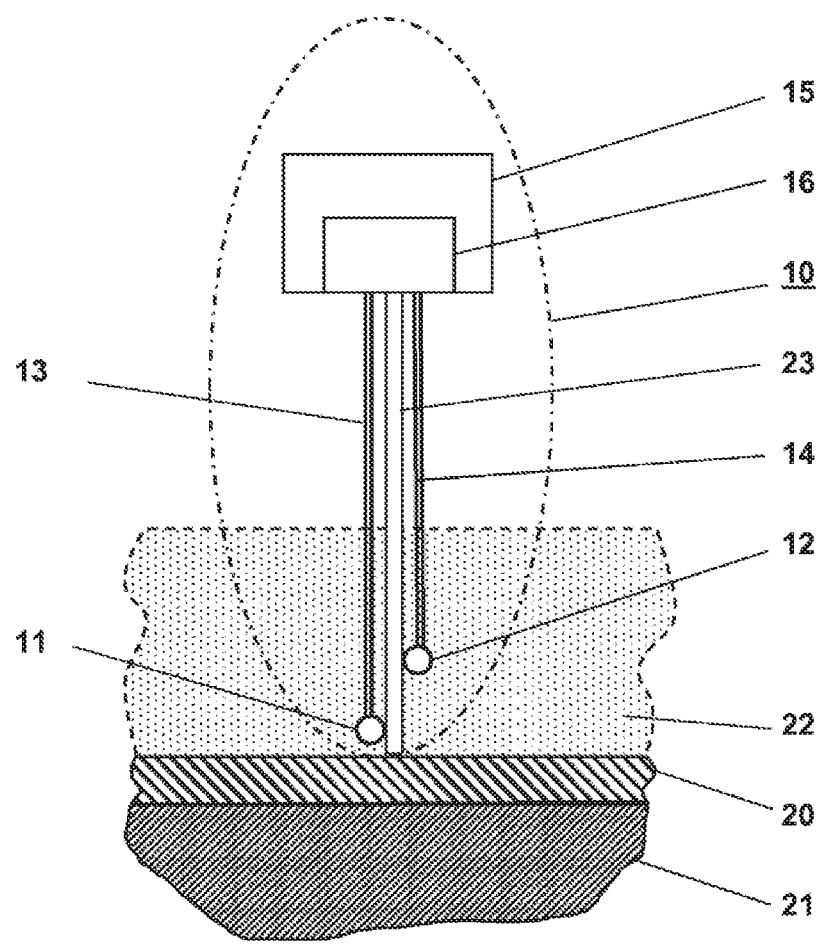

FIG. 2 shows a further temperature measuring device 10 with its components essential to the invention in a schematic diagram on a cut-out container wall 20 using identical reference signs for identical means. The temperature measuring device 10 essentially consists of a head housing 15, in which measured value processing device 16 are accommodated. A measuring sensor 11 is connected via a cable 13 to the measured value processing device 16 in the head housing 15. A reference sensor 12 is also connected via a separate cable 14 to the measured value processing device 16 in the head housing 15.

A measuring point for determining the temperature of a medium 21 which is enclosed in a container is also shown. A section of a container wall 20 of the container at the measuring point is representatively shown in this respect.

The temperature measuring device 10 is arranged outside the container, in the drawing plane above the container wall 20, at the measuring point, and the medium 21 is enclosed inside the container, in the drawing plane below the container wall 20.

On the outer surface of the container wall 20, the container may have a thermal insulation layer 22 which at least reduces heat flow between the outer surface of the container wall 20 and the surroundings.

In contrast to the temperature measuring device 10 shown in FIG. 1, this embodiment has a separate physical component which forms the main thermal connection path between the measuring point on the container wall 20 and the surroundings; that is, between the surface temperature and the ambient temperature, and is referred to below as the holder 23.

In an advantageous design of this embodiment, the holder 23 is designed to fasten the head housing 15 with the measured value processing device 16 to the container wall 20.

The measuring sensor 11 and the reference sensor 12 are connected to such holder 23 at a distance from one another. In this case, the measuring sensor 11 is arranged closer to the measuring point on the container wall 20 than the reference sensor 12. The measuring sensor 11 is arranged close to the measuring point. However, a compulsory contact with the measuring point can be dispensed with.

Assuming a constant shape with a constant cross-section, the holder 23 has a thermal resistance which is proportional to its length. The geometric distance of the reference sensor 12 from the measuring sensor 11 is smaller than the geometric distance of the reference sensor 12 from the measured value processing device 16 in the head housing 15. Given the proportionality of the thermal resistance of the holder 23, the ratio of the thermal resistances R2/R1 is in any case>1. All ratios of the heat resistances R2/R1 are particularly advantageously>10. The reference sensor 12 is arranged in the immediate vicinity of the measuring sensor 11.

The holder 23 can consist of a metallic material or of a ceramic material, for example a glass ceramic. In the case of a ceramic holder 23, the measuring sensor 11 and the reference sensor 12 are galvanically separated from a metallic container. This advantageously makes it possible to dispense with electrical insulations of the measuring sensor 11 and of the reference sensor 12 relative to the holder 23 and to a metallic container.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

10 Temperature measuring device
11 Measuring sensor
12 Reference sensor
13 Cable to the measuring sensor
14 Cable to the reference sensor
15 Head housing
16 Measured value processing device
20 Container wall
21 Medium
22 Insulation layer
23 Holder
R0, R1, R2 Thermal resistance

What is claimed is:

1. A temperature measuring device for determining a medium temperature by a temperature of a measuring point on a surface enclosing the medium, comprising:
   at least one measuring sensor arranged close to the measuring point, the at least one measuring sensor providing a measured value indicative of the medium temperature;
   at least one reference sensor disposed in a spaced relation relative to the measuring point; and
   a measured value processing device which is connected via at least one cable to the at least one measuring sensor and the at least one reference sensor,
   wherein the at least one measuring sensor and the at least one reference sensor are arranged in a spaced relation along a main thermal connection path between the surface enclosing the medium and a surrounding environment,
   wherein a thermal resistance between the at least one measuring sensor and the at least one reference sensor is smaller than a thermal resistance between the at least one reference sensor and the surrounding environment, and wherein the measured value processing device is configured to:
  determine a temperature gradient along the main thermal connection path between the measuring point on the surface enclosing the medium and the surrounding environment using the at least one measuring sensor and the at least one reference sensor; and
  determine a correction value for correcting the measured value based on the temperature gradient.

2. The temperature measuring device according to claim 1, wherein a ratio (R2/R1) of a thermal resistance (R2) between the at least one reference sensor and the surrounding environment and a thermal resistance (R1) between the at least one measuring sensor and the at least one reference sensor, R2/R1, is >10.

3. The temperature measuring device according to claim 1, wherein a ratio of a thermal resistance (R2) between the at least one reference sensor and the surrounding environment and a thermal resistance (R1) between the at least one measuring sensor and the at least one reference sensor (R2/R1) is >50.

4. The temperature measuring device according to claim 1, wherein the main thermal connection path between the surface enclosing the medium and the surrounding environment comprises a holder to which the at least one measuring sensor and the at least one reference sensor are fastened.

5. The temperature measuring device according to claim 1, wherein at least one further reference sensor is arranged on the main thermal connection path.

6. The temperature measuring device according to claim 1, wherein the main thermal connection path between the surface enclosing the medium and the surroundings comprises the at least one measuring sensor and at least one cable connected to the at least one measuring sensor.

7. The temperature measuring device according to claim 6, wherein the at least one cable connected to the at least one measuring sensor comprises a mineral-insulated sheathed cable.

8. The temperature measuring device according to claim 6, wherein the at least one measuring sensor is spaced apart from the measuring point.

9. A method for determining, by a temperature measuring device, a medium temperature by a temperature of a measuring point on a surface enclosing the medium, the temperature measuring device comprising at least one measuring sensor disposed near the measuring point, at least one reference sensor disposed in spaced relation to the at least one measuring sensor, and a measured value processing device that is connected via at least one cable to the at least one measuring sensor and the at least one reference sensor, the method comprising:
  determining, by the measured value processing device, a temperature gradient along a main thermal connection path between the surface enclosing the medium and a surrounding environment of the surface enclosing the medium using the at least one reference sensor; and
  determining, by the measured value processing device, a correction value for correcting a measured value of the at least one measuring sensor based on the temperature gradient.

10. The method according to claim 9, wherein the temperature gradient along the main thermal connection path between the surface enclosing the medium and the surrounding environment is determined near the measuring point by the at least one measuring sensor.

* * * * *